Jan. 23, 1968  J. D. FERNICOLA  3,365,084
UTILITY CAR TRUNK
Filed May 10, 1966
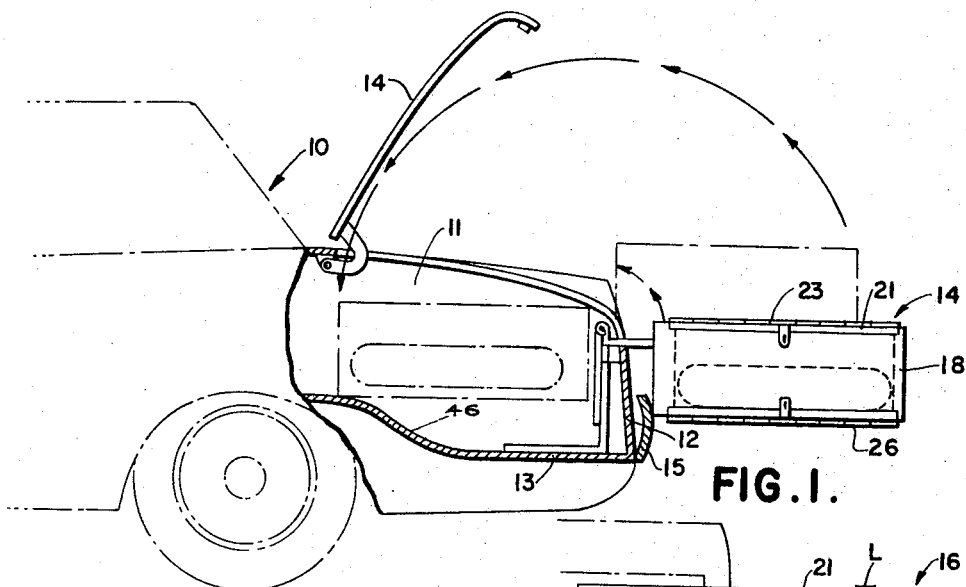
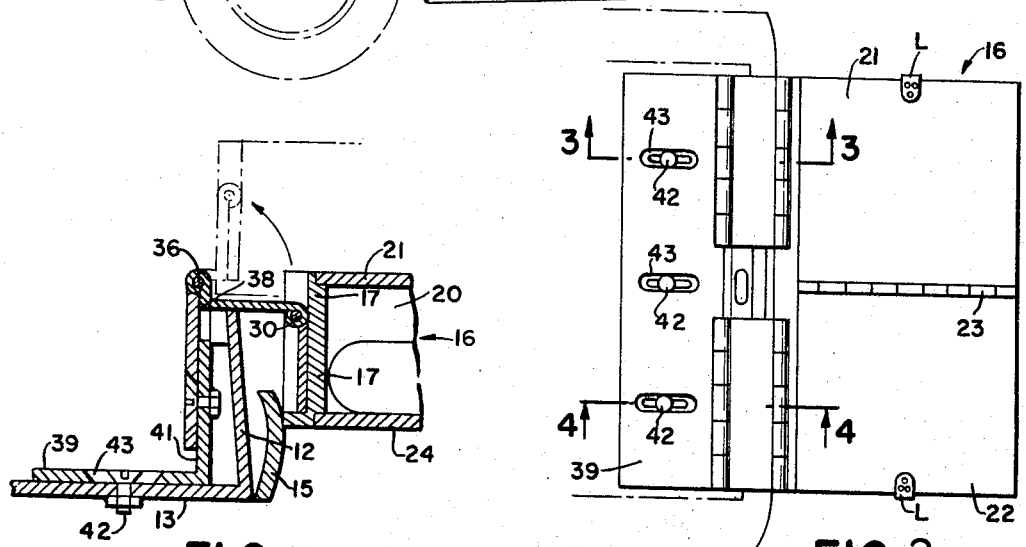
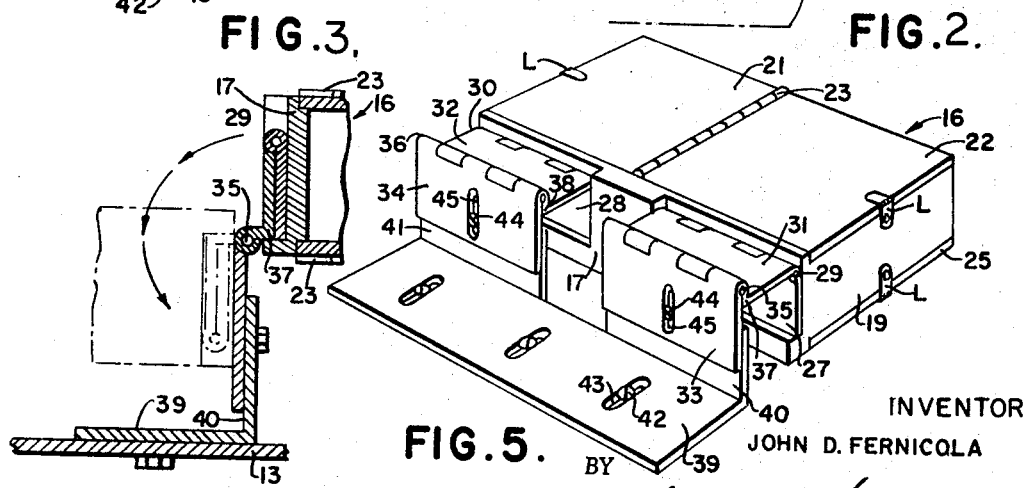
INVENTOR
JOHN D. FERNICOLA
BY
*Wesley Swarth* ATTORNEY

# United States Patent Office 3,365,084
Patented Jan. 23, 1968

3,365,084
UTILITY CAR TRUNK
John D. Fernicola, Centreville, Md. 21617
Filed May 10, 1966, Ser. No. 548,973
5 Claims. (Cl. 214—450)

ABSTRACT OF THE DISCLOSURE

A utility carrier for car trunk having a box-like container of a size to fit within the car trunk, the container attached to the floor of the car trunk by means of a link or shackle type hinge to enable the container to occupy either a position wholly within the trunk or be swung outwardly to a position without the trunk and to the rear thereof, and covers or lids on both top and bottom of the box-like container to afford access to the contents thereof when in either of the two positions.

The present invention relates to utility carrier for cars or automobiles; and more particularly to the type of carrier which may be attached to the rear of an automobile to extend rearwardly beyond the trunk area and the rear bumper to increase the load carrying capacity of the automobile.

Carriers of this general type in use heretofore present certain disadvantages, for example, they are in many cases clamped or otherwise releasably secured to the rear bumper or trunk sill of the automobile which necessitates their being attached when needed and detached when not, for if the empty carrier is left on the car it presents a rather unsightly appearance and adds useless excessive length to the car. In addition, when detached and removed from the car the question of storage presents itself for if stored in the car trunk it takes up valuable space and if stored in a place away from the car it may not be readily available if the need therefor should suddenly arise.

It is an object, therefore, of this invention to overcome the above disadvantages, as it will be apparent that the device contemplated may be permanently attached to the car and can, in one position, be disposed entirely within the trunk space of the car when extra carrying capacity is not needed, and in another position, be disposed outwardly and to the rear of the trunk when additional carrying capacity is needed. In addition, when disposed within the trunk it reduces very little the normal capacity of the trunk for even in its position within the car trunk the carrier's full storage capacity may be utilized.

The invention resides in certain constructions and combinations and arrangements of parts; and further objects and advantages thereof will become apparent to those skilled in the art to which the invention relates from the following description, with reference to the accompanying drawings forming a part of the specification, wherein like reference numerals indicate like parts and in which:

FIGURE 1 is a side elevational view of the carrier shown attached to an automobile with certain portions of the latter shown broken away and in section for clarity of illustration;

FIGURE 2 is a top plan view;

FIGURE 3 is a sectional view approximately on line 3—3 of FIGURE 2;

FIGURE 4 is a sectional view similar to FIGURE 3 taken substantially on line 4—4 of FIGURE 2 but with the carrier in a position ready for swinging into the car trunk; and FIGURE 5 is a perspective view of the device detached from the car.

As seen in FIGURE 1, 10 generally represents the rear portion of a conventional car body of the sedan or coupe type having a trunk compartment 11 located rearwardly of the passenger compartment, formed by side panels of the car body, a rear upstanding sill portion 12, bottom or floor panel 13 and hinged trunk lid 14. To the rear of the sill portion there is conventionally located the rear bumper 15 of the car. The structure thus far described is conventional in a great many present day automobiles with the exception that size and dimensional proportions of the parts may vary slightly in cars of different model or manufacture.

The carrier proper consists of a main body structure or box like container generally indicated at 16 having front and rear vertical walls 17 and 18 and side walls 19 and 20 respectively. The top consists of two top panels 21 and 22 hinged to each other and to the main body structure as shown at 23. Similarly the bottom is composed of two bottom panels 24 and 25 hinged to each other and to the main body structure on hinge means 26 similar to the hinge 23 on the top of the box like container.

The box like container may, if desired, be provided with a central vertical partition lying in the plane of the top and bottom hinge means 23 and 26 to divide the container into two separate compartments. It is to be understood however that this feature is optional only and is not a necessary feature of the invention disclosed.

The four top and bottom hinged panels are provided with any suitable latch means indicated at L to secure the same in closed position.

The box like container is hingedly connected to car body by means of a special hinge structure as hereinafter described.

Hinge leaves 27 and 28 are fixedly secured to the front wall of the container by any suitable means such as bolts and nuts or welding (not shown). The hinge leaves 27 and 28 in turn are hingedly connected at 29 and 30 to a second or intermediate set of hinge leaves 31 and 32, which latter leaves are hingedly connected to a third set of hinge leaves 33 and 34 on hinge means 35 and 36. It will be noted that the intermediate or second set of hinge leaves 31 and 32 have a right angular configuration adjacent the hinge means 35 and 36 as seen at 37 and 38 which limit the total swing of the second set of leaves to 270°, or, with the third set of hinge leaves in a fixed vertical position the second set cannot be swung outwardly beyond a horizontal position due to the stopping action of the right angular configuration as they abut the third set of hinge leaves 33 and 34 as is evident from an inspection of FIGURES 3 and 5 of the drawings.

The third set of hinge leaves 33 and 34 are secured in a vertical fixed position within the car trunk adjacent the rear trunk sill 12. To so fasten these hinge leaves in place they are secured to an angle piece having a horizontal flange 39 and vertical flanges 40 and 41. The flange 39 is fastened to the car trunk floor panel by means of bolts 42 through slots 43 in said flange. Similarly the vertical flanges 40 and 41 of the angle piece are fastened to the hinge leaves 33 and 34 respectively by means of bolts 44 through slots 45 in said leaves. The bolt and slot fastening of the angle piece on the trunk floor panel and between the vertical flanges and the third set of hinge leaves affords an adjustment whereby to adapt the carrier to cars of different make or style having varying dimensions of sill height and inclination.

The carrier thus described may be permanently fastened to the car and, at will, may be swung outwardly, as shown in FIGURE 1, whereby both the trunk space of the car and the carrier may be utilized for load carrying purposes. Access to the carrier in this position is had through hinged top panels 21 and 22. Should need for additional load space not be necessary, the carrier may be swung upwardly and over into the car trunk as indicated by the arcuate line of arrows seen in FIGURES 1, 3 and 4. The carrier may then receive articles normally placed directly in the car trunk and access thereto is had through the hinged bottom panels 24 and 25 as these panels are now in the "up" position.

In the embodiment of my invention shown, the main box like container of the carrier is fitted to a compact car in which the trunk floor panel 13 has an upwardly inclined portion 46 to provide axle and differential clearance below the trunk floor and the free edge of the container is shown resting on this inclined portion. Furthermore, the spare wheel of the car is shown contained within the box like container of the carrier. This arrangement facilitates removal of the spare wheel when need arises as the box like container may first be swung out of the car trunk and the wheel then removed from the container where it is more readily accessible.

It is evident, however, that in some cars the spare wheel is carried at the side of the car trunk space in vertical position and in others it is carried in a forward position within the trunk on a raised shelf-like portion over the rear axle. In any event, and regardless of whether the spare wheel is to be carried in the car trunk proper or in the container of the carrier, the box like container dimensions may be varied to most economically utilize the space within the car trunk.

It is to be understood that the above specific description of a preferred embodiment of my invention is not intended as a limitation of the invention claimed, but that variations thereof are contemplated, and the invention is limited only to the extent defined in the appended claims.

I claim:

1. In combination with an automobile having a trunk compartment, a utility carrier comprising an enclosed box like container dimensioned to fit within said trunk compartment, hinge means connected between the box like container and the trunk compartment whereby the box like container may be disposed entirely within said trunk compartment in upright position or swing outwardly and simultaneously inverted and disposed without the trunk compartment and adjacent thereto in inverted position and means on opposite sides of the box-like container affording access to the interior thereof when in either position.

2. The structure defined in claim 1 in which said means affording access to the interior of said container comprises latched closures on its upper and lower walls.

3. In combination with an automobile having a trunk compartment, a utility carrier comprising a box-like container dimensioned to fit within said trunk compartment, hinge means connected between the box-like container and the trunk compartment whereby the box-like container may be disposed entirely within said trunk compartment in upright position or swing outwardly and simultaneously inverted and disposed without the trunk compartment and adjacent thereto in inverted position, said hinge means comprising a three leaf hinge, the first leaf thereof secured to the box like container, the second leaf pivotally connected to the first leaf, the third leaf pivotally connected to the second leaf and means securing the third leaf within the trunk compartment.

4. The structure defined in claim 3 in which the means securing the third leaf within the trunk compartment is adjustable both vertically and horizontally.

5. The structure defined in claim 3 in which the second leaf is provided with a stop means cooperating with the third leaf to limit its outward swing to a position at 90° with respect to said third leaf.

References Cited

UNITED STATES PATENTS

| | | | |
|---|---|---|---|
| 2,063,598 | 12/1936 | Franklin | 296—37 |
| 2,518,342 | 8/1950 | Lim | 224—42.08 X |
| 2,552,898 | 5/1951 | Lenci et al. | 296—37 |

HUGO O. SCHULZ, *Primary Examiner.*